US006952729B2

(12) United States Patent
Bialk et al.

(10) Patent No.: US 6,952,729 B2
(45) Date of Patent: *Oct. 4, 2005

(54) NETWORK MANAGEMENT METHOD AND SYSTEM FOR MANAGING A BROADBAND NETWORK PROVIDING MULTIPLE SERVICES

(75) Inventors: Harvey R. Bialk, Littleton, CO (US); Jyoti A. Kulkarni, Englewood, CO (US); Paul E. Schauer, Highlands Ranch, CO (US)

(73) Assignee: AT&T Corp., New York, NY (US)

( * ) Notice: Subject to any disclaimer, the term of this patent is extended or adjusted under 35 U.S.C. 154(b) by 673 days.

This patent is subject to a terminal disclaimer.

(21) Appl. No.: 09/851,234

(22) Filed: May 8, 2001

(65) Prior Publication Data

US 2002/0169862 A1 Nov. 14, 2002

(51) Int. Cl.$^7$ .................. G06F 15/173; H04N 7/173; H04M 3/22
(52) U.S. Cl. .................. 709/224; 725/129; 709/223; 379/9.03
(58) Field of Search ................. 709/220, 223, 709/224; 725/129, 116, 119; 370/9.03; 714/25, 799

(56) References Cited

U.S. PATENT DOCUMENTS 4,972,453 A * 11/1990 Daniel et al. ............ 379/9.03
5,513,171 A * 4/1996 Ludwiczak et al. ...... 370/254

(Continued)

FOREIGN PATENT DOCUMENTS

EP   0 820 203 A   1/1998

WO   WO 96/38930 A1   6/1996

(Continued)

OTHER PUBLICATIONS

European Search Report Communication dated Aug. 31, 2004 for European Patent Application 02 253 205.5.

Bhatti S.N. et al,: "On Management of CATV Full Service Networks: A European Perspective" IEEE Network, IEEE Inc., New York, U.S. vol. 12, No. 5, Sep. 1998, pp. 28–39.

(Continued)

Primary Examiner—William A. Cuchlinski, Jr.
Assistant Examiner—Tam T. Phan
(74) Attorney, Agent, or Firm—Brooks Kushman P.C.

(57) ABSTRACT

A hybrid fiber coax (HFC) network management system and method for managing an HFC network having network elements operable for communicating telephony, data, and video signals with customer-premises equipment (CPE) of a subscriber. The HFC network management system includes an HFC network manager for monitoring status and configuration of the network elements and the CPE and for controlling configuration of the network elements and the CPE. A database is operable for storing data indicative of the configuration of the network elements and the CPE and the assigned capacity of the network elements. An online provisioning application link (OPAL) is operable for provisioning network elements with CPE based on the assigned capacity of the network elements to enable communication of telephony, data, and video signals between the HFC network and the CPE. A fault manager is operable for generating displays of the status and configuration of the network elements and the CPE. A trouble ticket system is operable for generating trouble ticket alerts in response to improper configuration/status of the network elements and the CPE.

11 Claims, 8 Drawing Sheets

U.S. PATENT DOCUMENTS

| | | | | |
|---|---|---|---|---|
| 5,519,830 A | * | 5/1996 | Opoczynski | 714/4 |
| 5,559,955 A | * | 9/1996 | Dev et al. | 714/4 |
| 5,608,447 A | * | 3/1997 | Farry et al. | 725/116 |
| 5,640,505 A | | 6/1997 | Bell et al. | |
| 5,761,432 A | | 6/1998 | Bergholm et al. | |
| 5,943,318 A | | 8/1999 | Badiee | |
| 6,023,775 A | * | 2/2000 | Fujii | 714/48 |
| 6,137,793 A | * | 10/2000 | Gorman et al. | 370/360 |
| 6,308,174 B1 | * | 10/2001 | Hayball et al. | 707/10 |
| 6,490,620 B1 | * | 12/2002 | Ditmer et al. | 709/224 |
| 6,711,135 B1 | * | 3/2004 | Dziekan et al. | 370/242 |

FOREIGN PATENT DOCUMENTS

| | | |
|---|---|---|
| WO | WO 99/15950 A1 | 9/1998 |
| WO | WO 99/15950 A | 4/1999 |
| WO | WO 00/74304 A2 | 4/2000 |
| WO | WO 01/30043 A2 | 10/2000 |

OTHER PUBLICATIONS

Gardner R. D. et al.: "Pattern Discovery and Specification Techniques for Alarm Correlation" Network Operations and Management Symposium, 1998. NOMS 98., IEEE New Orleans, LA, USA Feb. 15–20, 1998, New York, NY, USA, IEEE, US Feb. 15, 1998, pp. 713–722.

Haritsa J.R. et al.: "Mandate: Managing Networks Using Database Technology" IEEE Journal on Selected Areas in Communications, IEEE Inc., New York, U.S., vol. 11, No. 9, Dec. 1, 1993, pp. 1360–1372.

* cited by examiner

FIG. 8

NETWORK MANAGEMENT METHOD AND SYSTEM FOR MANAGING A BROADBAND NETWORK PROVIDING MULTIPLE SERVICES

CROSS-REFERENCE TO RELATED APPLICATIONS

This application is related to co-pending application "Method and System for Generating Geographic Visual Displays of Broadband Network Data" application Ser. No. 09/850,910 filed concurrently, co-pending application "Method and System for Provisioning Broadband Network Resources" application Ser. No. 09/851,235 filed concurrently, and co-pending application "Method and System for Providing an Efficient Use of Broadband Network Resources" application Ser. No. 09/851,285 filed concurrently.

TECHNICAL FIELD

The present invention relates generally to broadband networks such as hybrid fiber coax (HFC) networks providing multiple services and, more particularly, to a network management method and system for managing an HFC network providing multiple services.

BACKGROUND ART

Broadband networks such as hybrid fiber coax (HFC) networks deliver video, telephony, data, and, in some cases, voice over Internet Protocol (VoIP) services to consumers. Unlike traditional twisted pair local distribution networks, an HFC network must be managed to meet the capacity, availability, and reliability requirements of multiple services. Video, telephony, and data services share the same transport infrastructure to the customer's service location. Because this relationship exists, it is important that the set of HFC network management solutions meet the requirements of the HFC network and the requirements of the services transported by the HFC network to customers.

The introduction of high-speed data access and cable telephony services created an immediate need for enhanced monitoring capabilities. This need is being addressed by the deployment of external transponders associated with HFC network elements such as power supplies and fiber nodes. Additional surveillance capabilities are provided via the deployment of enhanced service network elements (i.e., host digital terminals (HDT)/network interface units (NIU) for telephony, cable modem termination systems (CMTS)/cable modems for data access such as Internet access) and element management systems. While this equipment provides a higher-level status monitoring it provides only a logical network view at best. The ability of an HFC network management system to correlate alarms to physical plant outages requires a network inventory/configuration manager that contains accurate physical network topology data.

The installation of increasing numbers of addressable intelligent end points in the HFC network (i.e., NIUs, cable modems) and transponders on HFC network elements along with network topology data provides the required information for an HFC network management system to monitor network and service performances levels. Then, either automatically or via a network operations technician, notification can be sent to a properly qualified technician without the need for manual sectionalization and multiple dispatches.

Management and surveillance of the deployed service-specific (video, telephony, and data services) elements must be managed by an HFC network management system having a common set of network management tools in order to leverage the increased benefit of cross-product network element correlation of the intelligent-end point devices. There are three operational considerations driving the development of an HFC network management system. First, integration and automation of systems and processes is necessary to provide scaleable solutions that can accommodate the anticipated volumes of customer growth and the associated complexity of the network management responsibility. This consideration is tempered by the second consideration of planning for maximizing efficiencies of existing resources. The third consideration is the delivery of a set of effective tools to the local workforce enabling management and maintenance of their local networks and service fulfillment and assurance to their customers in real time.

What is needed is an HFC network management method and system which enables the development of enhanced systems capabilities such as mechanization and automation in the areas of HFC services, network element provisioning, and fault management.

SUMMARY OF THE INVENTION

Accordingly, it is an object of the present invention to provide a broadband system having a hybrid fiber coax ( HFC) network managed by a network management system.

It is another object of the present invention to provide a network management system for managing an HFC network.

It is a further object of the present invention to provide a network management method for managing an HFC network.

In carrying out the above objects and other objects, the present invention provides an HFC network management system for managing an HFC network. The HFC network is provided with network elements operable for communicating telephony, data, and video signals with customer-premises equipment of a subscriber. The HFC network management system includes an HFC network manager for monitoring status of the network elements and the customer-premises equipment, for controlling configuration of the network elements and the customer-premises equipment, and for monitoring the configuration of the network elements and the customer-premises equipment.

A database may be operable with the HFC network manager for storing data indicative of the configuration of the network elements and the customer-premises equipment, and for storing data indicative of assigned capacity of the network elements. An online provisioning application link (OPAL) may be operable with the HFC network manager and the database for provisioning network elements with customer-premises equipment of the subscriber based on the assigned capacity of the network elements in order to enable communication of telephony, data, and video signals between the HFC network and the customer-premises equipment of the subscriber. A fault manager having an alarm visualization tool (AVT) may be operable with the HFC network manager and the database for generating visual displays of the status and configuration of the network elements and the customer-premises equipment of the subscriber. The HFC network management system may further include a trouble ticket system operable with at least one of the HFC network manager and the fault manager for generating trouble ticket alerts in response to improper configuration of at least one of the network elements and the customer-premises equipment.

Further, in carrying out the above objects and other objects, the present invention provides an HFC network management method for managing the HFC network. The HFC network management method includes monitoring status of the network elements and the customer-premises equipment and configuration of the network elements and the customer-premises equipment. Data indicative of the configuration of the network elements and the customer-premises equipment and data indicative of assigned capacity of the network elements are then stored. Network elements are then provisioned with customer-premises equipment of the subscriber by controlling the configuration of the network elements and the customer-premises equipment based on the data indicative of the assigned capacity of the network elements in order to enable communication of telephony, data, and video signals between the HFC network and the customer-premises equipment of a subscriber. Visual displays of the status and configuration of the network elements and the customer-premises equipment of the subscriber are then generated based on the monitored status of the network elements and the customer-premises equipment and the data indicative of the configuration of the network elements and the customer-premises equipment.

The above objects and other objects, features, and advantages of the present invention are readily apparent from the following detailed description of the best mode for carrying out the present invention when taken in connection with the accompanying drawings.

DETAILED DESCRIPTION OF THE DRAWINGS

Figure 1:
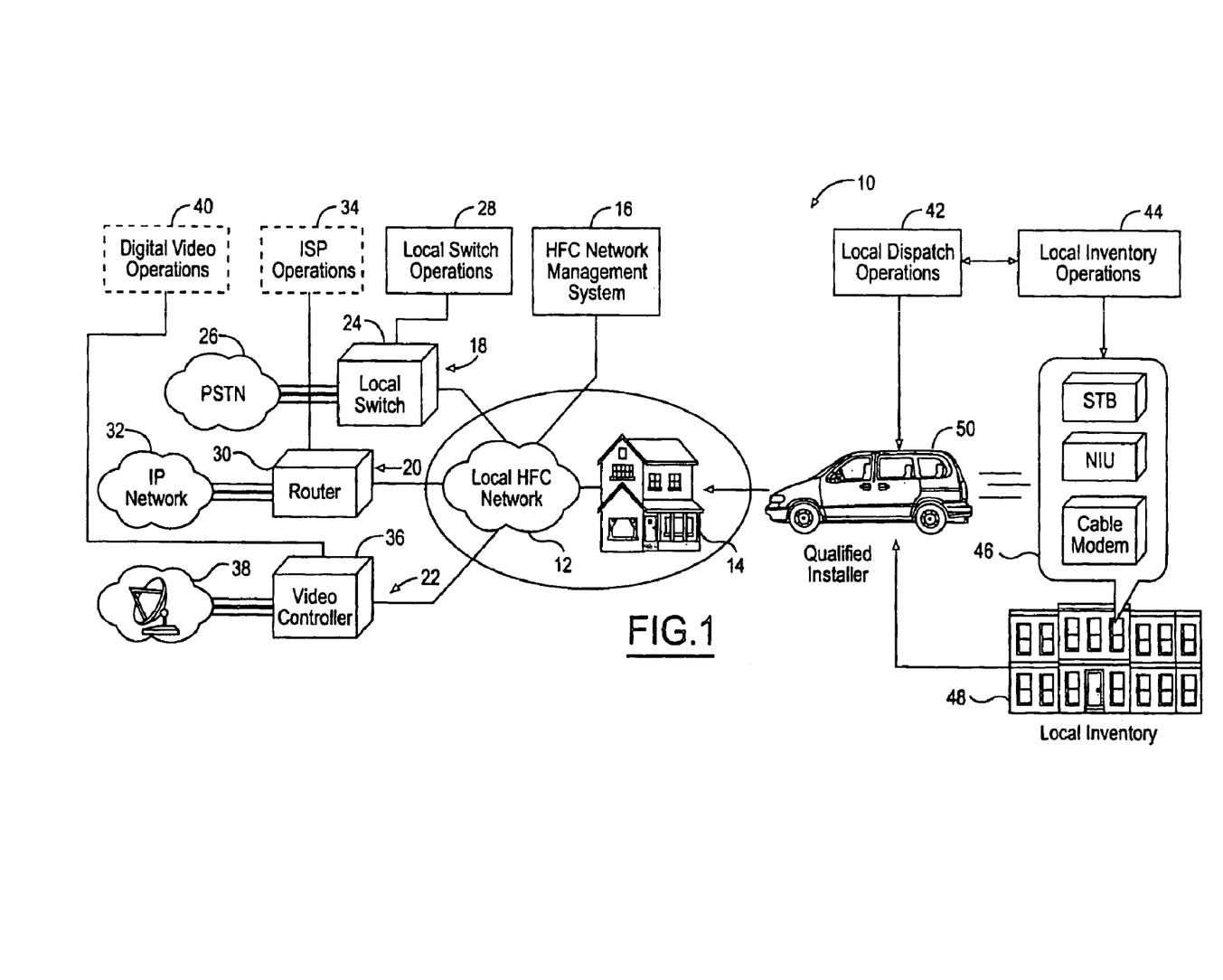
FIG. 1 illustrates a simplified block diagram of a broadband network having a hybrid fiber coax (HFC) network in accordance with a preferred embodiment of the present invention.

Referring now to FIG. 1, a broadband network 10 in accordance with a preferred embodiment of the present invention is shown. Broadband network 10 includes a hybrid fiber coax (HFC) network 12 for distributing telephony, data, and video services to a customer 14 connected to the HFC network. An HFC network management system 16 is operable with HFC network 12 for managing the HFC network. In general, HFC network management system 16 focuses on the provisioning, maintenance, and assurance of telephony, data, and video services over HFC network 12 for a customer 14. HFC network management system 16 provides automated system capabilities in the areas of HFC services, network element provisioning, and fault management.

HFC network 12 is operable for receiving and transmitting telephony, data, and video signals from/to a telephony service network 18, a data service network 20, and a video service network 22. HFC network 12 distributes telephony, data, and video signals from respective networks 18, 20, and 22 to a customer 14 connected to the HFC network. Telephony service network 18 includes a local switch 24 for connecting the public switched telephone network (PSTN) 26 to HFC network 12 and a local switch operations center 28 for controlling the local switch. Similarly, data service network 20 includes a data router 30 for connecting an Internet Protocol (IP) data network 32 to HFC network 12 and a Internet Service Provider (ISP) operations center 34 for controlling the router. Video service network 22 includes a video controller 36 for connecting a video source 38 to HFC network 12 and a video operations center 40 for controlling the video controller.

Customer 14 includes customer-premises equipment (CPE) elements for connecting with HFC network 12 to receive/transmit the telephony, data, and video signals. A local dispatch operations center 42 assists in provisioning the desired network elements to customer 14. Local dispatch operations center 42 communicates with a local inventory operations database 44 to select a desired (CPE) element 46 stored in a local inventory 48. Such CPE elements 46 include a set-top box (STB) for video service, a network interface unit (NIU) for telephony service, and a cable modem for data service. A qualified installer 50 receives instructions from local dispatch operations center 42 for installing a desired CPE element 46 stored in local inventory to the premises of customer 14.

Figure 2:
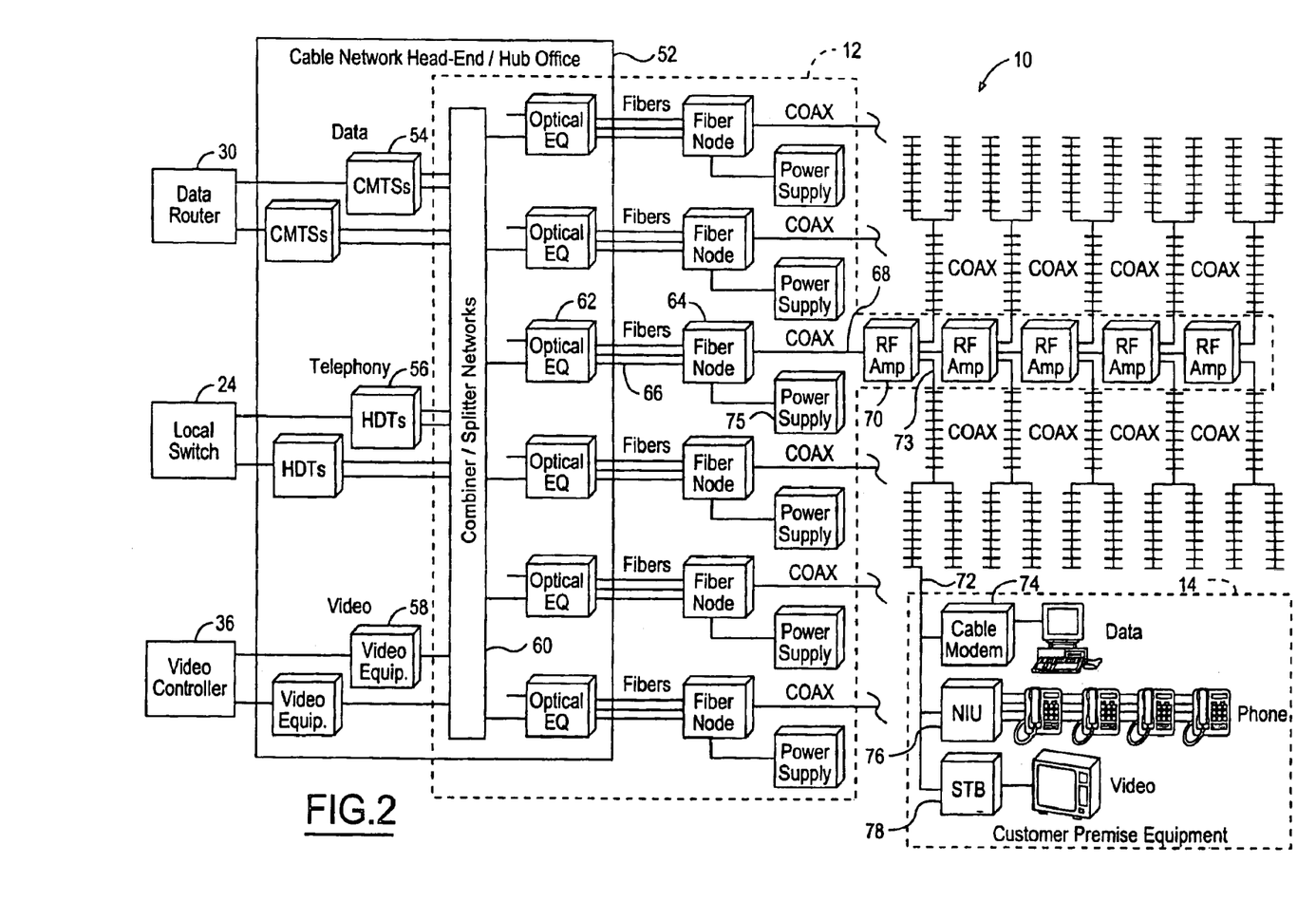
FIG. 2 illustrates a more detailed view of the broadband network shown in FIG. 1.

Referring now to FIG. 2, a more detailed view of broadband network 10 is shown. Broadband network 10 includes a cable network head-end/hub office 52. Data router 30, local switch 24, and video controller 36 are operable with hub office 52 to transmit/receive data, telephony, and video signals to/from customer 14 via HFC network 12. Hub office 52 includes a cable modem termination system (CMTS) 54 for communicating data signals such as IP data to/from data router 30; a host digital terminal (HDT) 56 for communicating telephony signals to/from local switch 24; and video equipment 58 for communicating video signals to/from video controller 36.

The head end of HFC network 12 is located within hub office 52 and connects with CMTS 54, HDT 56, and video equipment 58 for distributing the data, telephony, and video signals to/from customer 14. Specifically, HFC network 12 includes a combiner/splitter network 60 connected to CMTS 54, HDT 56, and video equipment 58. For communicating signals to customer 14, combiner/splitter-network 60 combines the data, telephony, and video signals into a combined signal and provides the combined signal to optical equipment 62. Optical equipment 62 (such as a primary or secondary hub ring) converts the combined signal into an optical signal and distributes the combined optical signal to a fiber node 64 via optical fibers 66. Fiber node 64 is generally located in the neighborhood of customer 14. A typical fiber node serves up to 1,200 customers and is powered by a power supply 75. Power supply 75 generates status information and has a transponder for communicating the status information to HFC network management system 16. Fiber node 64 converts the combined optical signal into a combined electrical signal for distribution on coaxial cable 68 located in the neighborhood of customer 14. An amplifier 70 amplifies the combined electrical signal and then provides the combined electrical signal to a node bus 73 and a port 72 associated with customer 14.

Customer 14 includes customer-premises equipment such as a cable modem 74, a network interface unit (NIU) 76, and a set-top box (STB) 78. Cable modem 74 extracts the data signal from the combined electrical signal; NIU 76 extracts the telephony signal from the combined electrical signal; and STB 78 extracts the video signal from the combined electrical signal. In order to communicate signals from customer 14 to hub office 52 for receipt by data router 30, local switch 24, and video controller 36, the signal flow process is reversed and combiner/splitter network 60 in hub office 52 splits the signal from the customer to the appropriate service network (data, telephony, or video).

Figure 3:
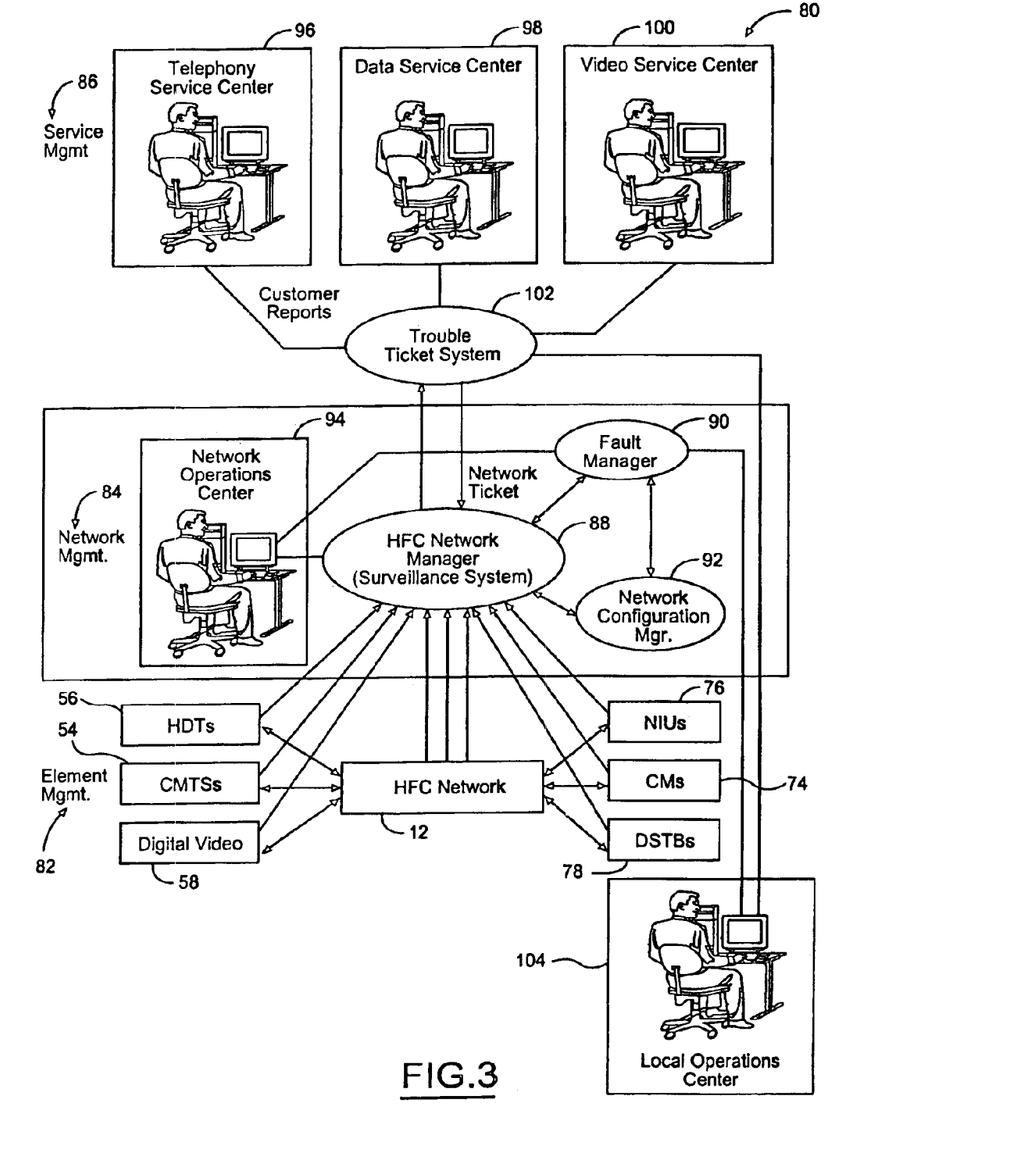
FIGS. 3 and 4 illustrate the Telecommunications Managed Networks (TMN) model of the HFC network management system in accordance with a preferred embodiment of the present invention.

Referring now to FIG. 3, a model 80 implementing HFC network management system 16 is shown. In general, the system capabilities within HFC network management system 16 are designed to adhere to the Telecommunications Managed Networks (TMN) model of the International Telecommunications Union. In accordance with the TMN model, model 80 includes an element management layer 82, a network management layer 84, and a service management layer 86. The service and provisioning systems provided by HFC network management system 16 spans all three management layers 82, 84, and 86.

Element management layer 82 is the physical equipment layer. Element management layer 82 models individual pieces of equipment such as HDTs 56, CMTSs 54, video equipment 58, cable modems 74, NIUs 76, and set-top boxes 78 along with facility links in HFC network 12. Element management layer 82 further models the data and processes necessary to make the equipment and facility links provide desired functionality. Element management layer 82 passes information to network management layer 84 about equipment problems, and instructions are received by the network management layer to activate, modify, or deactivate equipment features.

Network management layer 84 includes network management system 16. Network management system 16 generally includes a network manager 88, a fault manager 90, a network configuration manager 92, and a network operations center (NOC) 94 as will be described in greater detail below. Network management layer 84 deals with the interfaces and connections between the pieces of equipment. As such, network management layer 84 breaks down higher-level service requests into actions for particular systems required to implement these requests. Without a connectivity model, individual equipment systems are merely islands that must be bridged by human intervention.

Service management layer 86 associates customers with services provided by HFC network 12. Business service centers such as telephony service center 96, data service center 98, and video service center 100 are the primary part of service management layer 86 because they allow customers to request service. The provisioning activity originates from service management layer 86. Service management layer 86 further includes a trouble ticket system 102 for issuing trouble tickets to a local operations center 104.

In general, model 80 illustrates the systems and interfaces that support the functions of HFC network management system 16 with respect to HFC network 12 and the services that are provided by the HFC network. These functions, together with processes and systems, support business requirements such as HFC automated provisioning, automated trouble ticket creation and handling, and automated data analysis and reporting.

The functions of HFC management system 16 generally include HFC network-specific functions, services-specific network management functions, and HFC network- and services-specific functions. The HFC network-specific functions are status monitoring (surveillance), HFC network management, fault management (alarm correlation and trouble isolation), and performance management. The services-specific network management functions are network capacity management, service assurance (trouble ticketing and administration), network element management (elements are service-specific, e.g., HDTs support telephony service, CMTSs support data services, etc.), performance management, and system management (routers). The HFC network- and services-specific functions are configuration management and provisioning.

The processes and systems related to the functions of HFC management system 16 include sources of network topology data, network inventory and configuration management, network and services provisioning, network surveillance, network alarm correlation, network fault management, capacity management, service assurance, HFC telephony and data element management systems, and system management.

By integrating the functions, processes, and systems described above HFC network management system 16 can support various integrated applications. These integrated applications include automated HFC provisioning for telephony services, auto trouble ticket creation, visual outage correlation, and customer service representation.

Figure 4:
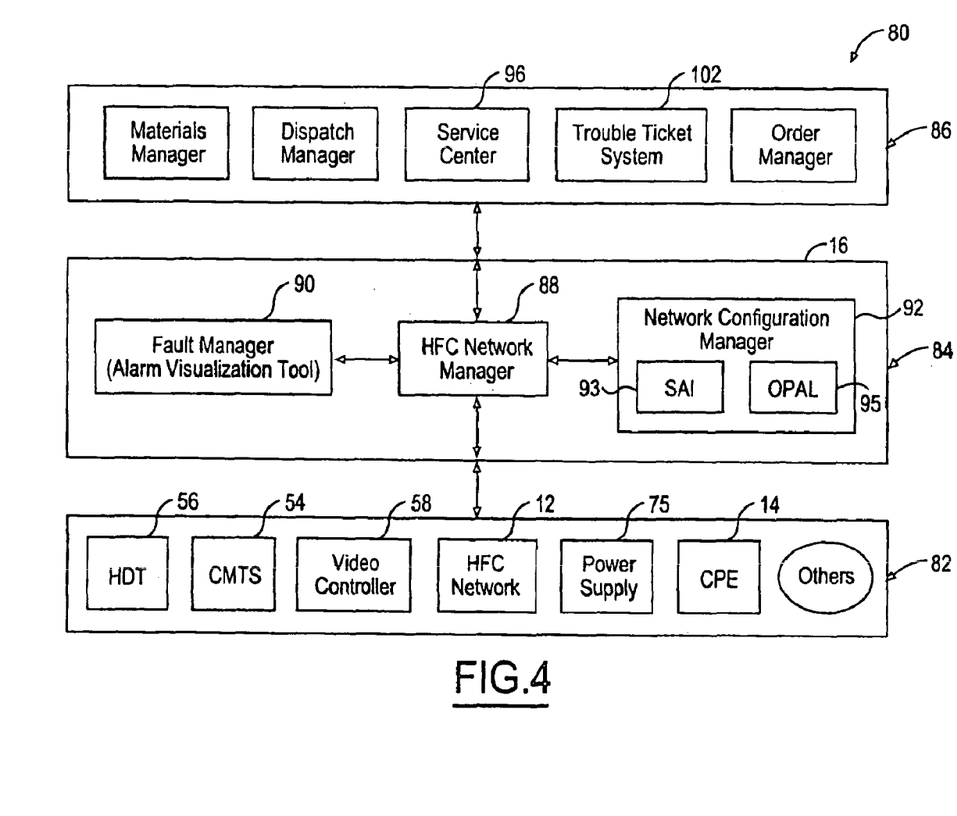

Referring now to FIG. 4, a block-level illustration of HFC network management system 16 implementation of the TMN model is shown. As described with reference to FIG. 3, element management layer 82 includes network elements 54, 56, and 58, HFC network 12, power supply 75, customer-premises elements 14, and other equipment. Element management layer 82 provides status information regarding these elements to HFC network manager 88 of HFC network management system 16 located in network management layer 84. HFC network manager 88 provides instructions to element management layer 82 on how to configure the elements located in the element management layer. HFC network manager 88 also provides information to service management layer 86 regarding the configuration of the elements within the element management layer and whether there are any problems with the configuration.

In general, HFC network management system 16 provides mechanization and automation of operation tasks for HFC network 12. In order to support these operation tasks, network management layer 84 of HFC network management system 16 includes HFC network manager 88, a fault manager 90, and a network configuration manager 92. Fault manager 90 includes a geographical information system tool referred to herein as an alarm visualization tool (AVT). AVT 90 supports visual correlation of network elements and customer impact. Network configuration manager 92 includes a service, design, and inventory (SDI) system 93 having a database representing HFC network 12. The database of SDI system 93 stores data representing the assigned capacity of HFC network 12. Network configuration manager 92 further includes an online provisioning application link (OPAL) 95. OPAL 95 accommodates automated provisioning of services to customers. The association of HFC system- and service-specific network elements and associated facilities provides surveillance and fault management tools that are able to aid network operations center 94 and local operations center 104 to respond to service-affecting network events.

A brief overview of the main components in model 80 will now be described. Trouble ticket system 102 of service management layer 86 is used to support customer trouble management and the fault management process of HFC network management system 16. Trouble ticket system 102 supports all services (telephony, data, and video) and supports automated data collection for analysis and reporting systems. Interfaces to HFC network manager 88 and SDI system 93 are implemented to support network-generated tickets and field maintenance trouble referrals.

AVT 90 demonstrates and verifies the applicability of graphical visualization of HFC network 12 and service alarms. AVT 90 includes capabilities for assisting telephony and data maintenance operations in the trouble sectionalization, isolation, and resolution process. AVT 90 provides geographical displays with varying zoom levels (from country to street and household level) overlaid with node boundary, distribution plant layout, and equipment at single dwelling unit (SDU) and multiple dwelling unit (MDU) premises. The views of AVT 90 also represent switch and head end locations, associated hubs, secondary hubs, and connectivity between them. Alarm and status information are shown via color codes and icon size of the equipment representations. AVT 90 displays ticket indicators as representations (icons) separate from alarms. Through these geographical views an operator will be able to visually correlate event information. AVT 90 also assists operators in initiating trouble resolution processes via the ability to launch trouble tickets from the displays.

HFC network manager 88 supports the alarm surveillance and fault management process. HFC network manager 88 includes a rules-based object-oriented system to support auto ticket creation through trouble ticket system 102 and a geographic information system for visual correlation and alarm correlation with support from SDI system 93.

SDI system 93 is a network configuration management application that supports HFC network provisioning, fault management, and capacity management processes. SDI system 93 also serves as the database of record for supporting the alarm correlation of the fault management process. OPAL 95 provides auto provisioning functionality with the assistance of SDI system 93.

HFC Network-Specific Functions

The network-specific functions are functions that are common to HFC network 12 regardless of the services (telephony, data, video) that are offered by HFC network.

1. Status Monitoring

Status monitoring for the HFC plant includes telemetry information and is deployed in all power supplies and fiber nodes. This technology contributes to network availability by enabling preemptive maintenance activities to head off network outages. Status monitoring alerts are useful in detecting problems with standby inverter batteries. This alone enables proactive maintenance to ensure the ability to ride through short-duration electric utility outages. Alerts from cable plant power supplies also determine when standby generators should be deployed to maintain powering through long-duration commercial power outages. Upstream spectrum management systems are deployed to accept autonomously generated messages that indicate a degraded condition in the upstream bands. Fundamentally, these systems are spectrum analyzers with the capability of masking normal spectrum behaviors from abnormal conditions and reporting such abnormalities.

2. Network Management

HFC network manager 88 supports fault management functions for HFC network 12. Included in the supported fault management functions are surveillance of the HFC outside plant, message filtering, basic alarm management (e.g., notify, clear, retire alarms), and test access support. HFC network manager 88 also supports visual alarm correlation, management of some provisioning command execution, and exporting status and traffic information to network operations center 94.

HFC network manager 88 aggregates device fault information and includes a software system that allows development of message-processing rules and behaviors. HFC network manager 88 includes standard modules that allow it to communicate with any network protocol. The software resides on a server in each local market. This ensures scalability, reliability, local visibility, fault location, and a distributed computing environment. The numerous connectivity capabilities ensure that HFC network manager 88 can communicate with AVT 90, SDI system 93, and OPAL 95.

HFC network manager 88 is the primary tool available to technicians of network operations center 94. Because HFC network manager 88 interfaces to the various vendor-provided element management systems, the HFC network manager provides a uniform view for network operations center 94 into those systems. This insulates the technicians from each piece of equipment that has its own particular management system and protocol. Additionally, the current fault rule sets perform one universal function: display faults as messages are received, and clear the fault when a corresponding clear is received. This contrasts with many vendor element management systems which provide a waterfall of continuously streaming arrays of messages where faults and clears are shown on the same screen sorted by time only.

Because HFC network manager 88 is a rule-based system, the HFC network manager can implement advanced criteria designed by network and equipment subject-matter experts into tangible behaviors described below. Such behaviors are a powerful tool for managing the projected numbers of faults.

3. Fault Management

Prior to HFC network management system 16, manual correlation of information available from network elements was used to isolate problems. Incoming alarms were read from tabular listings on multiple workstations. Additional information was then obtained about location and serving area from databases, maps, and spreadsheets. Trouble tickets were reviewed to see if related customer problems exist. This method demonstrated the effectiveness of correlation, but is very time consuming and may result in details being overlooked due to the manual nature of the process.

The present invention provides an enhanced correlation methods for fault management through a strategy that combines automated, visual, and cross-product correlation of customer-reported problems and status information from intelligent network elements. The present invention presents this information in an automated user-friendly fashion, network managers can quickly isolate problems in the network as to their root cause and location.

HFC network manager 88 is the data collection and processing engine for telephony, data, and video equipment. Alerts from element managers and customer-reported problem data from trouble ticketing system 102 are managed by HFC network manager 88. HFC network manager 88 processes these alerts against predefined rule sets to perform advanced correlation. HFC network manager 88 dips into the database of SDI system 93 to look up the logical relationships and service address information that the calculations require. HFC network manager 88 stores the results from the correlation processing in a database.

AVT 90 is used in parallel to automated event correlation. AVT 90 includes a spatial database that relates alarm information from HFC network manager 88 with network configuration data from the database of SDI system 93, geo-coded homes passed information, and landbase and spatial data. AVT 90 is a web-based graphics tool that allows network operations center 94 to view real-time status of faults in broadband network 10. This maximizes the efficiency and effectiveness of network operations center 94 in identifying telephony alarms and correlation of these alarms to customer proximity, plant and equipment proximity, and connectivity proximity for the resolution of alarms, problems, and customer service.

The following sections describe how automated correlation along with visual and cross-product correlation is performed in accordance with a preferred embodiment of the present invention. In addition, the description of reports that are generated by SDI system 93 in support of the fault management is provided.

a. Automated Correlation

Systems that can perform automated correlation of managed elements are needed to establish associations between problems with customer's service and the equipment that delivers those services. In order to perform automated correlation, logical connectivity relationships need to be established between the elements of broadband network 10 and the common equipment and transmission paths. A database (the database of SDI system 93) representing the local network connectivity (HFC infrastructure) and the elements connected to the network will enable the delivery of services (telephony, data, and video) to a customer location. This database is needed as a source of reference for HFC network management system 16. In order to support fault management capability through automated correlation, the database of SDI system 93 must be an accurate database. The database of SDI system 93 models and inventories head end equipment, fiber node, and CPE. Connectivity and serving area information for this equipment is established as part of the provisioning process for advanced services.

b. Visual Correlation

Visual correlation enables network operations center 94 to relate the location of faulted CPE with HFC network 12 feeding them. AVT 90 displays street maps of the regions that have been overlaid with HFC cable plant diagrams. These maps also show the serving area boundaries for each fiber node. In addition to this static information, color-coded dynamic symbols representing type of service, status of intelligent network elements, and the customer reported problems are also displayed. Geo-coding of network elements and customer service addresses enables the symbols to be accurately located on the maps relative to the streets and physical plant. This method quickly presents a visual indication of services that are experiencing problems and the location of customers impacted.

c. Cross-Product Correlation

Correlation is significantly more powerful when multiple services are provided. By determining if one or more products in the same section of the network are experiencing problems or are operating normally, common equipment and transmission paths can be identified or eliminated as the trouble source.

Figure 5:
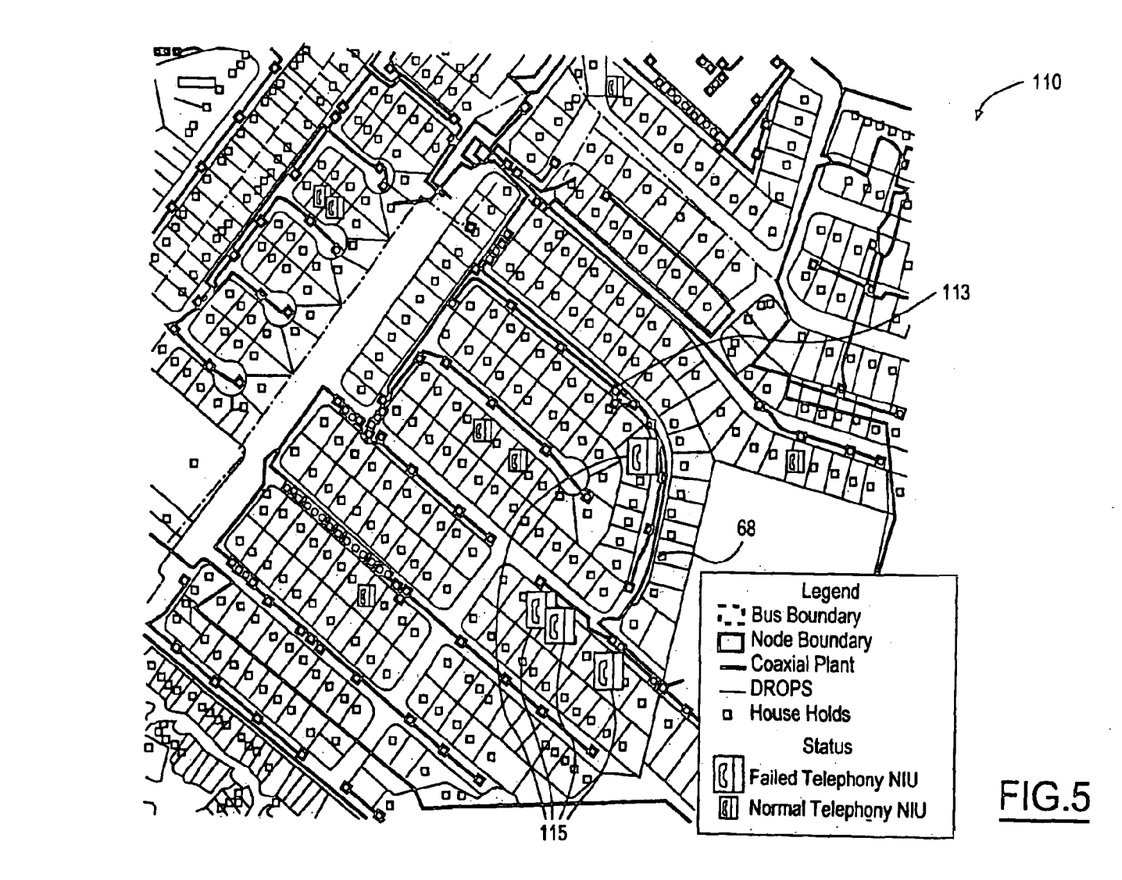
FIGS. 5, 6, and 7 illustrate examples of visual correlation displays generated by the alarm visualization tool of the HFC network management system.

FIG. 5 illustrates an example of a visual correlation display 110 of some failed telephony NIUs 115 generated by AVT 90. Display 110 provides a great deal of information about the location of a telephony problem. In addition to the failed telephony NIUs 115, display 110 shows the importance of knowing what is in the normal state. In display 110 it is still uncertain if the problem is in cable plant 68 or head end 52. It appears that a single amplifier 113 feeds all the failed telephony NIUs 115.

Automated correlation information can further isolate the problem by indicating if the same modem equipment in head end 52 serves all the failed cable modems 127. It could also indicate if any working cable modems 125 are served by the same modem equipment in head end 52. If they are not, or there are working devices off that same modem equipment in head end 52, then it is likely that the problem is in cable plant 68. If they are served by the same modem equipment in head end 52, then trouble location is not certain. Additional information from other products could contribute in further isolating the problem.

Figure 6:
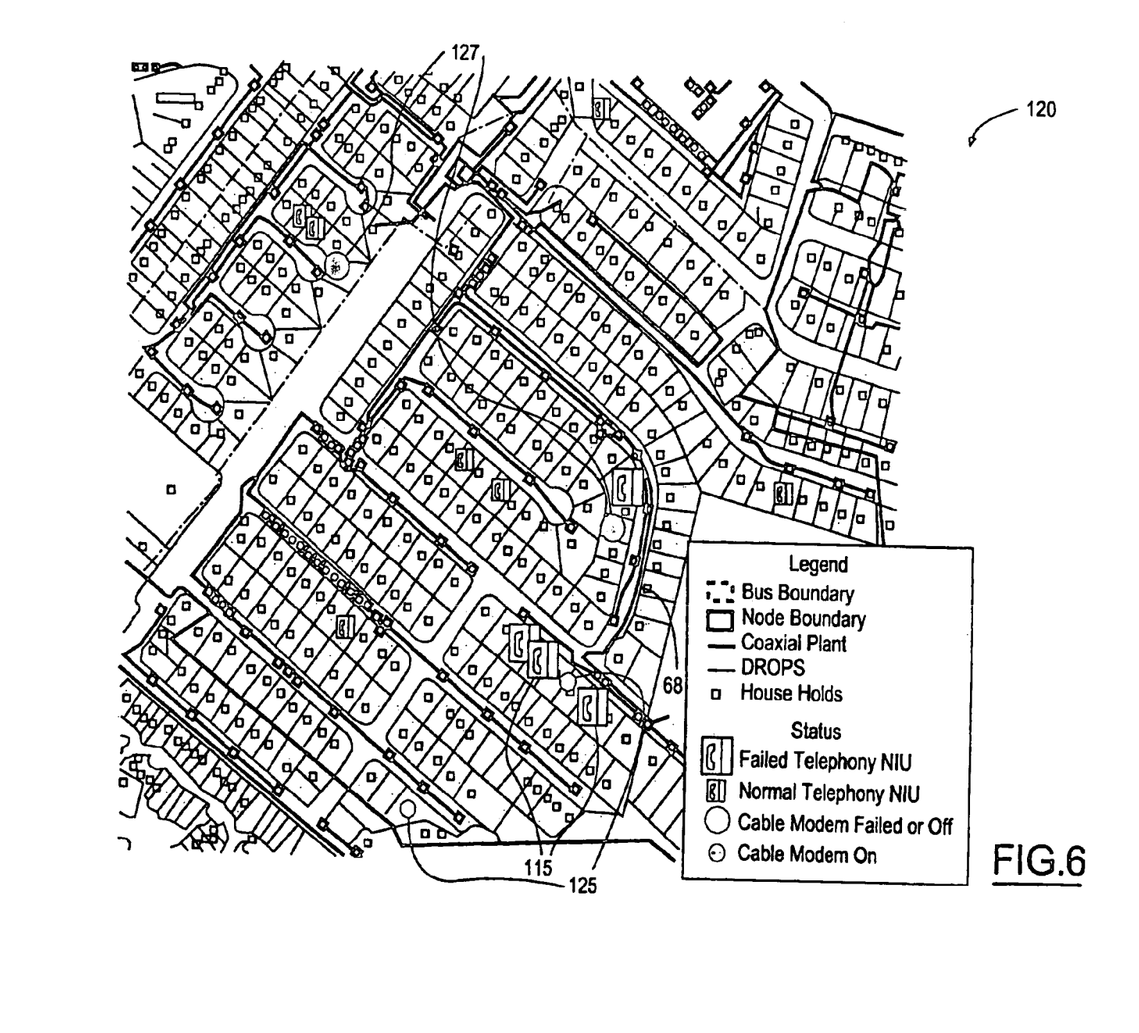

FIG. 6 illustrates a second visual correlation display 120 generated by AVT 90. Display 120 includes Internet cable modem status information. Correlation can now be made against cable modems 125 and 127. In the area of the failed telephony NIUs 115 there is one operating cable modem 125. Even though other modems in the node are turned off this one piece of information indicates that cable plant 68 serving this area may be properly functioning. Looking for trouble at head end 52 may make more sense than sending a technician to look for line problems, particularly if all the failed telephony devices 115 are off the same cable modem equipment in head end 52.

In addition to the alarm data from the intelligent network elements, trouble ticketing system 102 provides the address and trouble type information from customer-reported problems. This is also displayed on the mapping system. The report clusters from this source can be useful in identifying soft failures, degradation, or content problems that are not accompanied by active elements but impact service.

Figure 7:
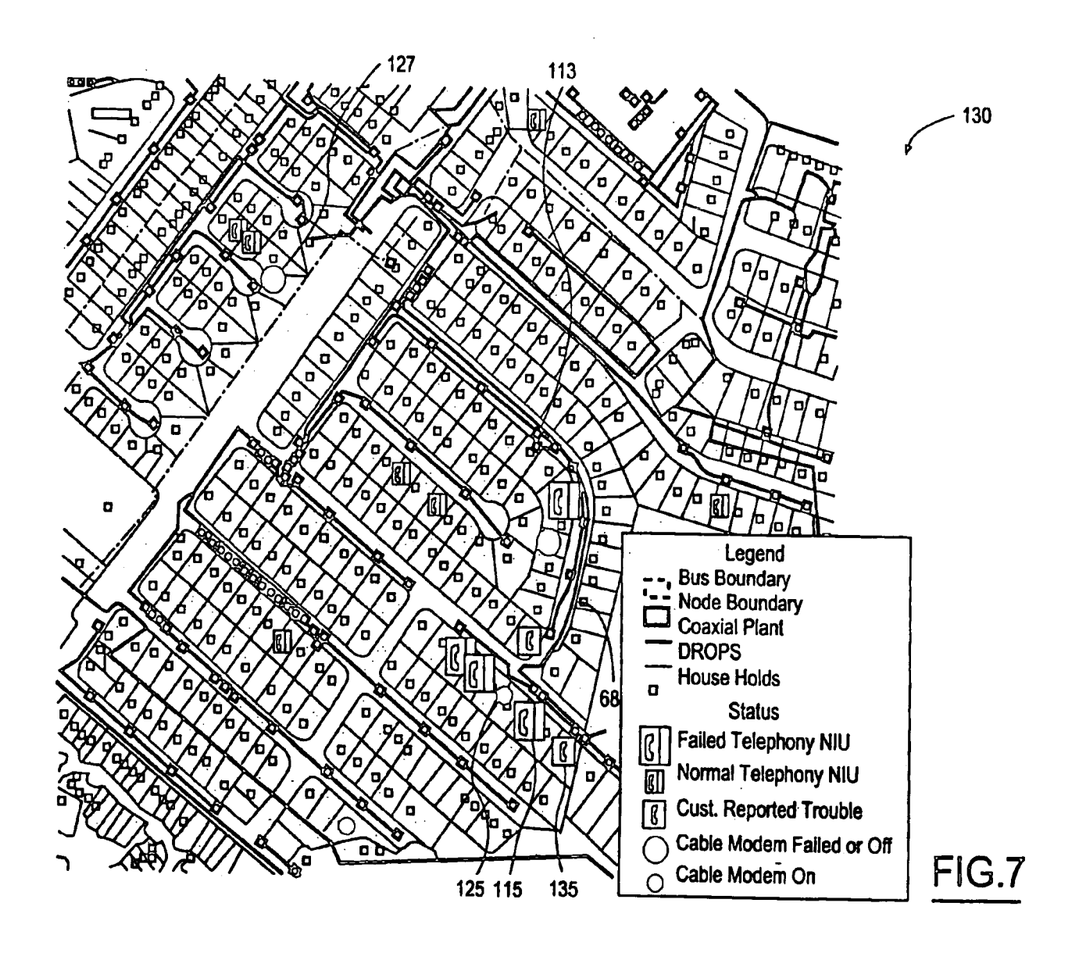

FIG. 7 illustrates a third visual correlation display 130 generated by AVT 90 which includes a new symbol 135 that indicates customer-reported troubles. Visual or automated correlation desirably includes all elements in HFC network 12 which could possibly become single points of failure for different services or service areas. This includes network elements which are physically but not logically related For example: fiber facilities between the hub and the head end are not protected and are typically bundled with other node facilities. Automated or visual correlation must be able to identify those common points of failure which could affect several nodes 64, such as a fiber cut or failure of a power supply 75 which serves all or parts of several nodes. The plant database must include knowledge of fiber for different nodes 64 sharing a common fiber bundle 66.

d. Reports From SDI System in Support of Fault Management

Referring back to FIGS. 1–4, SDI system 93 provides query capability that includes two primary queries. One is a query by phone number, customer 14 name, service address, or NIU 76 serial number. The returning data would be customer 14 name, service address, latitude and longitude, each NIU 76 serving that customer and associated NIU serial number, telephone number associated with each port 72 on the NIU, fiber node 64, and HD. The second query would be a query by fiber node 64 or HDT 56. The returning data would be a list of customers and all NIUs 76 associated with customer 14.

Services-Specific Network Management Functions

The services-specific network management functions are those functions that are network management functions but are service-specific and are different for different services.

1. Network Capacity Management

Capacity management is a high-priority function because HFC network 12 supports advanced services (telephony, data, and video). There are four major components for telephony capacity management: 1) fixed capacity (voice ports) based on concentration per head end modem node and NIUs 76; 2) fixed capacity between HDT 56 and the local switch including interface group management; 3) capacity based on traffic pattern and analysis; and 4) customer reference value allocation and management. In the case of direct connect MDUs, capacity issues resolve around: 1) channel allocation, 2) transport capacity to local switch 24, 3) capacity based on traffic pattern and analysis, and 4) customer reference value allocation and management. The major components for data capacity management include: 1) fixed capacity based on the technology platform, 2) capacity based on traffic pattern and analysis, and 3) fixed capacity between CMTSs 54 and data service providers 32.

For telephony capacity management, SDI system 93 has telephony services modeled in its database. Based on business rules which govern the number of customers provisioned per head end modem, fixed capacity is derived. This measurement is used for example for capacity planning and for adding additional capacity to a hub.

2. Service Assurance (Trouble Ticketing and Administration)

Trouble ticketing system 102 in conjunction with HFC network management system 16 provides for a robust and efficient service assurance capability having improvements in system to human interface, system-to-system interoperability with other trouble ticketing systems, data storage systems and technician dispatch workflow systems, and network element management systems. Primary goals include automation of all aspects of trouble ticket generation, flow management, and closure to include escalation and event notification. A short cycle implementation of easily designed and modified schemas, data field sets, and report queries that can be managed by network operator administrators meet the requirement to support a dynamic operational and business environment. A peer-to-peer distributed server architecture with synchronized data storage is used to ensure performance and redundancy as concurrent user and managed network elements scale to an estimated 1000 operators and 45 million objects respectively.

Trouble ticketing system 102 includes a rules-based trouble management system software application that maximizes operational efficiencies through field auto population, rules-based ticket workflow, user and management team maintenance of trouble, solution and script text, markets, organizations, and user data. Trouble ticketing system 102 integrates with HFC network manager 88 for automatic trouble ticket generation. HFC network manager 88 identifies and locates alarms and modifies data fields based on rules/tables, opens and auto-populates applicable data fields, or closes a trouble ticket.

3. Network Element Management

HFC network manager 88 communicates with element managers regarding network elements. HFC network manager 88 gathers performance, alarm, and utilization data from network equipment and communications facilities. HFC network manager 88 also distributes instructions to network elements so those maintenance tasks such as grooming, time slot assignment, provisioning, and inventory are performed from a central location.

HFC Network- and Services-Specific Functions

The HFC network- and services-specific functions are not separable into network related functions or services-specific functions. For example, for telephony service, the provisioning and configuration management cannot be broken out into network and services. This is because in the case of telephony service, until NIU 76 is installed, network configuration and provisioning is not complete. This is because NIU 76 is a managed network element and it is really port 72 off of the NIU that is activated during the service-provisioning process. Currently, for new service orders, the installation of an NIU 76 takes place only after the service is ordered (i.e., as a task related to service provisioning). The service configuration and provisioning takes place after NIU 76 is installed and a port 72 on the NIU is assigned for the telephony service.

1. Configuration Management

The database of SDI system 93 has two components for configuration management: 1) network inventory and 2) network configuration. The network inventory is the inventory of actual network equipment (physical) and the network configuration describes how that equipment is configured and connected (physical and logical). The configuration information is vital to automate the provisioning process and to perform efficient and effective fault management.

SDI system 93 is an object-oriented software system that does network inventory management and design management (circuit design). SDI system 93 defines and tracks a customer's network service path from customer location to HDTs 56. SDI system 93 provides strict referential integrity for network equipment, network connectivity, customer's network service path, and services that are provisioned via this network service path.

The database of SDI system 93 models HFC network 12 using a data-rule structure. The data-rule structure represents the equipment, facilities and service links, and provisioned telephony customers. The data structure further represents links between HDTs 56 and fiber nodes 64, NIUs 76, customer location, and aggregate links from the HDTs to the NIUs at customer 14 locations. The telephony serviceable household passed (HHP) data defines the base geographic units (cable runs) in the database of SDI system 93. The HHP data is accurately geo-coded including the relation of address location to fiber node 64, coax cable run 68, and latitude and longitude. The data-rule structure demonstrates the ability to capture the basic elements and relationships of HFC network 12 to support the NOC fault management process. The database of SDI system 93 associates each telephony-ready household passed address to a fiber node 64 and coax cable bus 68 associated with this address. The database of SDI system 93 includes the data elements required to support the provisioning process and provides report capability to support network management alarm correlation and fault management.

SDI system 93 supports network inventory and topology data and acts as a configuration system that allows for changes to be made to the network. Significant changes to the network can be entered through a batch load process and small changes can be entered using a GUI interface. The data is needed from various sources such as engineering data (equipment and cable links), HHP data along with association of house to fiber node 64 and coax cable bus 68 it is served by, and data associated with customers 14 that were provisioned prior to SDI system deployment. The HHP data includes house key, address, latitude, longitude, fiber node 64, coax cable bus 68, hub 52 number, power supply 75, etc. The equipment location data includes location for fiber nodes 64 and hubs 52 with addresses, latitudes, and longitudes. The equipment data includes equipment profiles and equipment inventory such as HDTs 56, fiber nodes 64, forward and return paths, etc. The network cabling data includes data determined by system architecture and actual cabling inventory and includes relationships of node/forward path/reverse paths, laser transmitters and receivers, and power supplies. The network aggregate link data is based on equipment, cable inventory, and network architecture.

Figure 8:
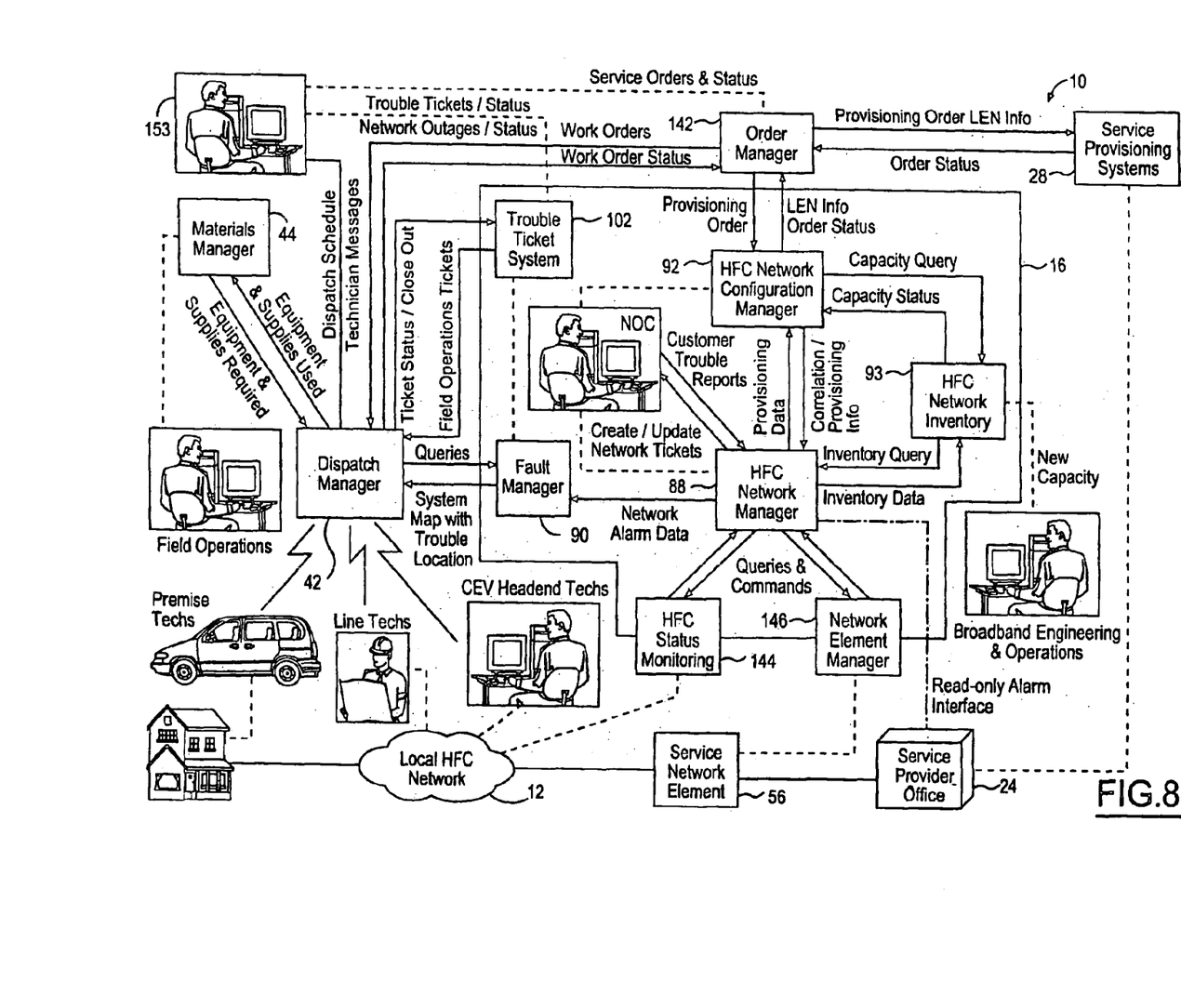
FIG. 8 illustrates a highly detailed view of the HFC network management system and the broadband network.

Referring now to FIG. 8, a highly detailed view of HFC network management system 16 within a broadband network environment is shown. In general, the applications of HFC network management system 16 normalize many of the variables that exist in HFC network 12 so as to allow the definition and support of provisioning and maintenance interfaces to the service management layers. The interfaces and set of service delivery processes and functions established are reusable for telephony, data, and video services because the same set of functions need to occur and only the rules are different based on the service-enabling network elements. This implies that any network management system application desirably is an object-based, component architecture solution which is rules- and tables-driven to provide the flexibility and scale to address a high-capacity multiple-services network element environment. The goal of HFC network management system 16 is to integrate and automate system support such that human intervention is minimally needed.

FIG. 8 represents a set of component systems and interfaces that are necessary to achieve integrated network management and automated HFC provisioning, automated trouble ticket generation, and automated fault management capabilities in a broadband network 10 having an HFC network 12. As introduced above, these are three key network management functions performed by HFC network management system 16.

The first key network management function is the automation of HFC provisioning. For example, after a customer service representative 153 takes an order for telephony service provisioning of the telephony service begins. The provisioning of a customer's telephone service has two primary considerations. The first consideration is to provision a logical HFC circuit connecting the appropriate CPE 76 to the corresponding appropriate head end office (HDT 56). The second consideration is provisioning a local switch 24 that delivers dial tone and features. Automation of HFC network provisioning means without manual intervention. As shown in flowchart 160 of FIG. 9, this translates into receiving an order from an order manager 142 as shown in block 162, assigning appropriate HFC network elements for that order as shown in block 164, generating a line equipment number (LEN) as shown in block 166, and sending the LEN back to the order manager (as shown in block 168) that can use the LEN to provision the local switch in conjunction with service provisioning systems 28 as shown in block 170.

Figure 9:
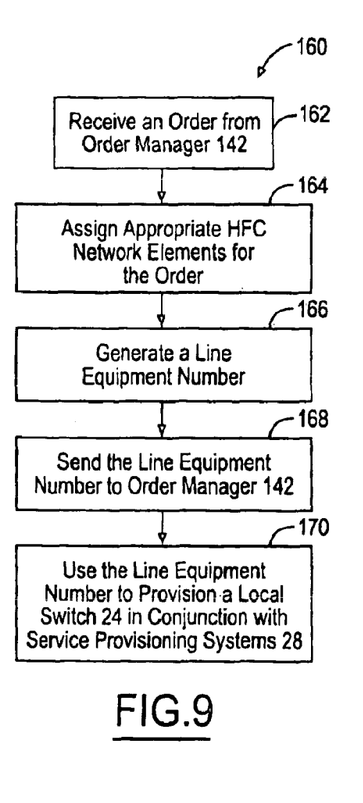
FIG. 9 illustrates a flow chart describing operation of the automation of HFC network provisioning in accordance with a preferred embodiment of the present invention.

The HFC service provisioning includes the assignment of HFC network components as shown in block 164 to create a logical circuit connecting the CPE to the corresponding appropriate hub office equipment. This includes traversing the various coax bus, fiber node, fiber path, and hub office equipment. The automation of HFC provisioning depends on the HFC network configuration data being readily available. The database of SDI system 93 supports automated provisioning by storing existing HFC network topology. The database of SDI system 93 has the ability to maintain a referential integrity of network equipment, network connectivity, and logical service paths associated with customer services.

Order manager 142 provides workflow control for the ordering and interactions with other processes such as billing and dispatch provided by dispatch manager 42. SDI system 93 is notified of an order request via an interface with order manager 142. SDI system 93 will transfer the order request to HFC network manager 88 which in turn then interfaces to HDT network element manager 146. HDT network element manager 146 then executes the provisioning commands.

There are five separate areas that should be automated to achieve fully automated designs in SDI system 93. The first is order creation entry of order data into the database of SDI system 93 which is performed by an interface to order manager 142 for full automation. The second is design—selection of the components (NIU 76, HDT 56, etc.). The third is implementation—sending HDT/HEM to the HDT network element manager 146, sending the LEN to order manager 142, and test data (from the HDT network element manager). The fourth is interfaces for systems such as SDI system 93, HFC network manager 88 can take an SDI system request and turn it into a sequence of commands necessary for provisioning a particular service on a particular piece of equipment. The fifth is broadband development—sequences of HFC network manager 88 that allow a single calling point to execute desired functions such as add new service, modify existing service, and delete service. This is required for each desired function in each particular piece of equipment.

Referring now back to FIG. 8, the second key network management function is automated trouble ticket creation. The following is a list of capabilities for accomplishing the goal of auto trouble ticket creation: data feed from fault manager 90 into outage tables of trouble ticket system 102; integration with customer service representative tools for enhanced automated rules-based diagnostic testing, capture, and auto-population of diagnostic information into appropriate data fields; integration with SDI system 93 via HFC network manager 88 to provide wide-scale and drill down system outage alert and notification for enhanced trouble correlation; an interface to include simple diagnostic tool interface and auto trouble ticket generation/assignment based on diagnostic results and rules/tables.

The third key network management function is automated fault management. HFC status monitoring 144 of HFC network manager 88 monitors HFC network 12 for configuration and problem status. Similarly, network element manager 146 of HFC network manager 88 monitors service network element 56 (i.e., HDT, CMTS, and video equipment) for configuration and problem status. HFC network manager 88 generates alarm data if there are any problems. Fault manager 90 uses the alarm data in conjunction with the network configuration data stored in the database of SDI system 93 to generate a graphical display of the location and type of problems.

Thus it is apparent that there has been provided, in accordance with the present invention, an HFC network management system that fully satisfies the objects, aims, and advantages set forth above. It is to be understood that the network management system in accordance with the present invention may be used to manage other broadband networks providing multiple services such as fixed wireless networks. While the present invention has been described in conjunction with specific embodiments thereof, it is evident that many alternatives, modifications, and variations will be apparent to those skilled in the art in light of the foregoing description. Accordingly, it is intended to embrace all such alternatives.

What is claimed is:

1. A broadband network comprising:

a hybrid fiber coax (HFC) network having network elements operable for communicating telephony, data, and video signals with customer-premises equipment of subscribers;

wherein the network elements include a host digital terminal (HDT) for communicating the telephony signals, a cable modem termination system (CMTS) for communicating the data signals, and video equipment for communicating the video signals;

wherein the network elements further include a fiber optics node connected at one end to the HDT, the CMTS, and the video equipment by a fiber optics network and connected at the other end to the customer-premises equipment by coax;

an HFC network manager for monitoring status of the network elements and the customer-premises equipment, for controlling configuration of the network elements and the customer-premises equipment, and for monitoring the configuration of the network elements and the customer-premises equipment;

a service, design, and inventory (SDI) database operable with the HFC network manager for storing data indicative of the configuration of the network elements and the customer-premises equipment, for storing data indicative of assigned capacity of the network elements, and for storing data indicative of physical and logical connections between the HFC network and the customer-premises equipment of the subscribers;

an online provisioning application link (OPAL) operable with the HFC network manager and the database for automatically provisioning network elements with the customer-premises equipment of the subscribers based on the assigned capacity of the network elements such that the network elements and the customer premises equipment are logically connected in order to enable communication of telephony, data, and video signals between the HFC network and the customer-premises equipment of the subscribers;

a fault manager having an alarm visualization tool operable with the HFC network manager and the database for generating visual displays of the status and configuration of the network elements and the customer-premises equipment of the subscribers; and a trouble ticket system operable with at least one of the HFC network manager and the fault manager for generating trouble ticket alerts in response to improper status of at least one of the network elements and the customer-premises equipment.

2. The broadband network of claim 1 wherein: the HFC network manager updates the improper status of the at least one of the network elements and the customer-premises equipment to a proper status after the trouble ticket alert has been addressed.

3. The broadband network of claim 1 further comprising: a trouble ticket system operable with at least one of the HFC network manager and the fault manager for generating trouble ticket alerts in response to improper configuration of at least one of the network elements and the customer-premises equipment.

4. The broadband network of claim 3 wherein:
the HFC network manager updates the improper configuration of the at least one of the network elements and the customer-premises equipment to a proper configuration after the trouble ticket alert has been addressed.

5. The broadband network of claim 1 further comprising:
an order manager operable with the OPAL for monitoring the provisioning of HFC network elements with customer-premises equipment by OPAL.

6. The broadband network of claim 1 wherein:
the HFC network manager uses a rules-based system for monitoring the status and configuration of the network elements and the customer-premises equipment.

7. In a broadband network having a hybrid fiber coax (HFC) network provided with network elements operable for communicating telephony, data, and video signals with customer-premises equipment, a network management system for managing the HFC network, the HFC network management system comprising:

an HFC network manager for monitoring status of the network elements and the customer-premises equipment, for controlling configuration of the network elements and the customer-premises equipment, and for monitoring the configuration of the network elements and the customer-premises equipment;

wherein the network elements include a host digital terminal (HDT) for communicating the telephony signals, a cable modem termination system (CMTS) for communicating the data signals, and video equipment for communicating the video signals;

wherein the network elements further include a fiber optics node connected at one end to the HDT, the CMTS, and the video equipment by a fiber optics network and connected at the other end to the customer-premises equipment by coax;

a service, design, and inventory (SDI) database operable with the HFC network manager for storing data indicative of the configuration of the network elements and the customer-premises equipment, for storing data indicative of assigned capacity of the network elements, and for storing data indicative of physical and logical connections between the HFC network and the customer-premises equipment of the subscribers;

an online provisioning application link (OPAL) operable with the HFC network manager and the database for automatically provisioning network elements with the customer-premises equipment of the subscribers based on the assigned capacity of the network elements such that the network elements and the customer premises equipment are logically connected in order to enable communication of telephony, data, and video signals between the HFC network and the customer-premises equipment of the subscribers;

a fault manager having an alarm visualization tool operable with the HFC network manager and the database for generating visual displays of the status and configuration of the network elements and the customer-premises equipment of the subscribers; and a trouble ticket system operable with at least one of the HFC network manager and the fault manager for generating trouble ticket alerts in response to improper status of at least one of the network elements and the customer-premises equipment.

8. The HFC network management system of claim 7 wherein: the HFC network manager updates the improper status of the at least one of the network elements and the customer-premises equipment to a proper status after the trouble ticket alert has been addressed.

9. The HFC network management system of claim 7 further comprising: a trouble ticket system operable with at least one of the HFC network manager and the fault manager for generating trouble ticket alerts in response to improper configuration of at least one of the network elements and the customer-premises equipment.

10. The HFC network management system of claim 9 wherein:
the HFC network manager updates the improper configuration of the at least one of the network elements and the customer-premises equipment to a proper configuration after the trouble ticket alert has been addressed.

11. The HFC network management system of claim 7 further comprising:
an order manager operable with the OPAL for monitoring the provisioning of HFC network elements with customer-premises equipment by OPAL.

* * * * *